United States Patent [19]
Eom

[11] Patent Number: 5,724,104
[45] Date of Patent: Mar. 3, 1998

[54] ON-SCREEN DISPLAY/VIDEO SIGNAL PROCESSOR FOR A MONITOR

[75] Inventor: Jeong-Ouk Eom, Seoul, Rep. of Korea

[73] Assignee: Daewoo Electronics Co., Ltd., Seoul, Rep. of Korea

[21] Appl. No.: 536,730

[22] Filed: Sep. 29, 1995

[30] Foreign Application Priority Data

Sep. 30, 1994 [KR] Rep. of Korea ............ 94-24935

[51] Int. Cl.$^6$ .............................. H04N 5/50; H04N 5/445
[52] U.S. Cl. ............................ 348/569; 348/564; 348/589
[58] Field of Search ............................ 348/563, 569, 348/598, 599, 600, 589, 588, 586, 564, 565, 566; H04N 5/445, 5/45, 5/50, 9/74, 9/76

[56] References Cited

U.S. PATENT DOCUMENTS

| 5,206,728 | 4/1993 | Kim | 348/564 |
| 5,461,398 | 10/1995 | Tang | 348/589 |

Primary Examiner—Sherrie Hsia
Attorney, Agent, or Firm—Lowe, Price, LeBlanc & Becker

[57] ABSTRACT

An on-screen display/video signal processor is disclosed which prevents the output of video signals while generating a fast blanking signal when on-screen display mode selection key is selected by a user. The on-screen display/video signal processor has a video signal muter for removing video signals with an input of the fast blanking signal. The quality of an on-screen display can be increased with a generation of the fast blanking signal and a rapid removal of video signals.

18 Claims, 5 Drawing Sheets

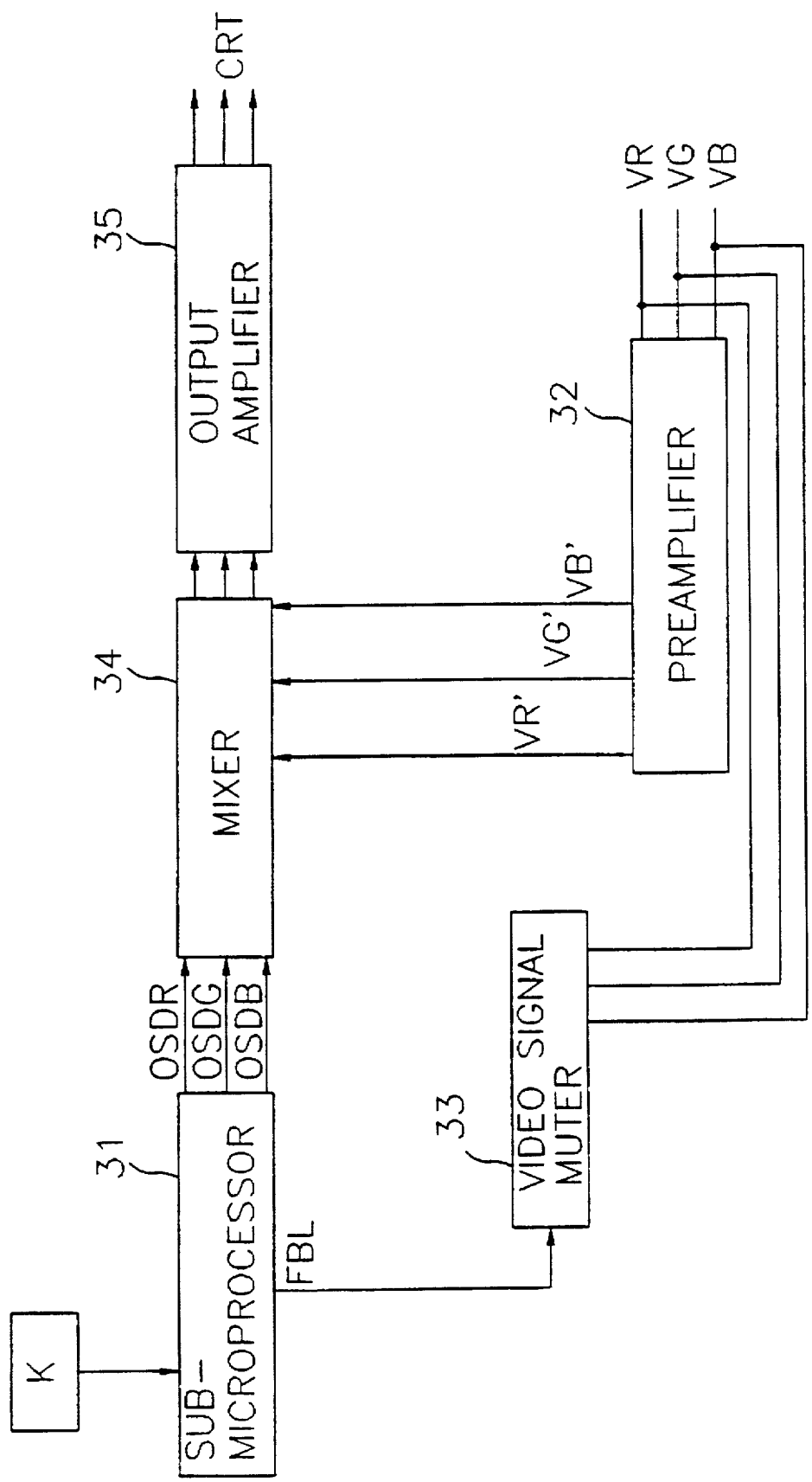

ON-SCREEN DISPLAY/VIDEO SIGNAL PROCESSOR FOR A MONITOR

BACKGROUND OF THE INVENTION

1. Field of the Invention

The present invention relates to an image processing system, more particularly to an on-screen display/video signal processor for a monitor capable of processing an on-screen signal.

2. Description of the Prior Art

In general, an on-screen display mode (hereinafter OSD display mode) is employed in a monitor for maintaining the best quality display with controls for contrast, brightness, vertical and horizontal sizes, etc. Such a monitor is provided with a selection key for selecting the OSD display mode. When a user selects the selection key for the OSD display mode, a selection signal corresponding to the selection key is supplied to a sub-microprocessor built in an on-screen display/video signal processor (hereinafter OSD display/ video signal processor) of a monitor. The sub-microprocessor generates an on-screen display signal (hereinafter OSD display signal) for controlling contrast, brightness, horizontal and vertical sizes stored in advance so as to obtain an enhanced display of the monitor. The user can control the contrast, brightness, horizontal and vertical sizes for the best display while viewing changes of the contrast, brightness, horizontal and vertical sizes.

A conventional monitor as shown in FIG. 1 includes a microprocessor 1 for setting a suspend mode, an off mode, or an on mode by sensing existing or non-existing of a vertical synchronization signal $V_S$ and a horizontal synchronization signal $H_S$ supplied from a main processor of a computer (not shown) built in the monitor; an OSD display/ video signal processor 2 for supplying to a cathode-ray tube (CRT) a signal generated according to a mode set in microprocessor 1 with inputs of video signal V and an OSD display signal OSD provided from the main processor; and a deflection circuit 3 for generating a deflection signal with inputs of vertical synchronization signal $V_S$ and horizontal synchronization signal $H_S$ supplied microprocessor 1 and for deflecting beams supplied from OSD display/video signal processor 2 to the cathode-ray tube by a deflection signal generated according to vertical synchronization signal $V_S$ and horizontal synchronization signal $H_S$ from microprocessor 1. In case of such a monitor, a video image or an OSD display is performed on the screen of the monitor according to the video signal or the OSD display signal generated from the main processor of the computer built in the monitor.

FIG. 2 is a detailed block diagram for showing a conventional OSD display/video signal processor of FIG. 1 in order to explain the operations of an OSD display. As shown in FIG. 2, video signals VR, VG and VB from the main processor of the computer are amplified by a preamplifier 21 of OSD display signal processor 2. Amplified video signals VR', VG' and VB' are inputted to an output amplifier 23 after their respective transformation to signals, each having a video signal level through a mixer 22. The transformed signals outputted from output amplifier 23 are applied to the cathode-ray tube, to thereby display an video image or perform an OSD display on the screen of the monitor.

At that time, if a selection signal generated from selection of an OSD display mode selection Key K is applied to a sub-microprocessor 24, sub-microprocessor 24 generates OSD display signals OSDR, OSDG, and OSDB each of which defines contrast, brightness, vertical and horizontal sizes, etc. When OSD display signals OSDR, OSDG and OSDB are generated, a fast blanking signal FBL is generated to remove video signals VR', VG' and outputted from preamplifier 21.

When fast blanking signal FBL of a high level is supplied to preamplifier 21, preamplifier 21 is disabled to prevent video signals VR', VG' and VB' from transmitting from preamplifier 21 to mixer 22. OSD display signals OSDR, OSDG and OSDB are respectively transformed in mixer 22 to signals of video signal levels since respective OSD display signals OSDR, OSDG and OSDB are outputted in a TTL level (transistor-transistor logic level). The transformed signals are applied to the cathode-ray tube after being amplified in output amplifier 23, to thereby perform an OSD display on the screen monitor.

In the conventional monitor, a fast blanking signal is generated in a high level from a sub-microprocessor. The fast blanking signal is applied to preamplifier. At this time, the preamplifier becomes disabled so that no output is generated therefrom. Accordingly, there exists a drawback in that, until blocking the outputs of video signals by a fast blanking signal, OSD display signal and video signal are simultaneously supplied to an output amplifier, to hereby deteriorate the quality of an OSD display.

SUMMARY OF THE INVENTION

Accordingly, it is an object of the present invention to provide an OSD display/video signal processor for a monitor capable of blocking an output of a video signal while generating a fast blanking signal.

In order to accomplish the above object, the OSD display/ video signal processor according to the present invention includes an OSD display mode selection key. An OSD display mode selection signal is generated when the OSD display mode selection key is selected by a user. The OSD display mode selection signal is supplied to a sub-microprocessor so as to generate an OSD display signal and a fast blanking signal. The OSD display/video signal processor has a preamplifier for amplifying a video signal. The fast blanking signal is inputted into a video signal muter so as to mute an output signal of the preamplifier. The OSD display signal and the amplified video signal are supplied to a mixer. The mixer converts the OSD display signal or the amplified video signal in a TTL level to a signal of a video signal level able to be displayed. An output signal of the mixer is provided to an output amplifier before the output signal is supplied to a cathode-ray tube.

The OSD display/video signal processor according to the present invention may be provided with a video signal muter for muting a signal inputted to the preamplifier according to the fast blanking signal. Muting the video signal while generating a fast blanking signal causes the output signal of the preamplifier to be rapidly eliminated so as to prevent the output of a video signal amplified by a preamplifier. Therefore, the quality of a display on a monitor can be enhanced.

BRIEF DESCRIPTION OF THE DRAWINGS

The above objects and other advantages of the present invention will become more apparent by describing in detail a preferred embodiment thereof with reference to the attached drawings in which:

FIG. 5 is a block diagram for illustrating an OSD display/video signal processor according to second embodiment of the present invention.

DETAILED DESCRIPTION OF THE INVENTION

Description will be made in detail hereinafter on an OSD display/video signal processor according to first embodiment of the present invention in reference to the accompanying drawings.

Figure 1:
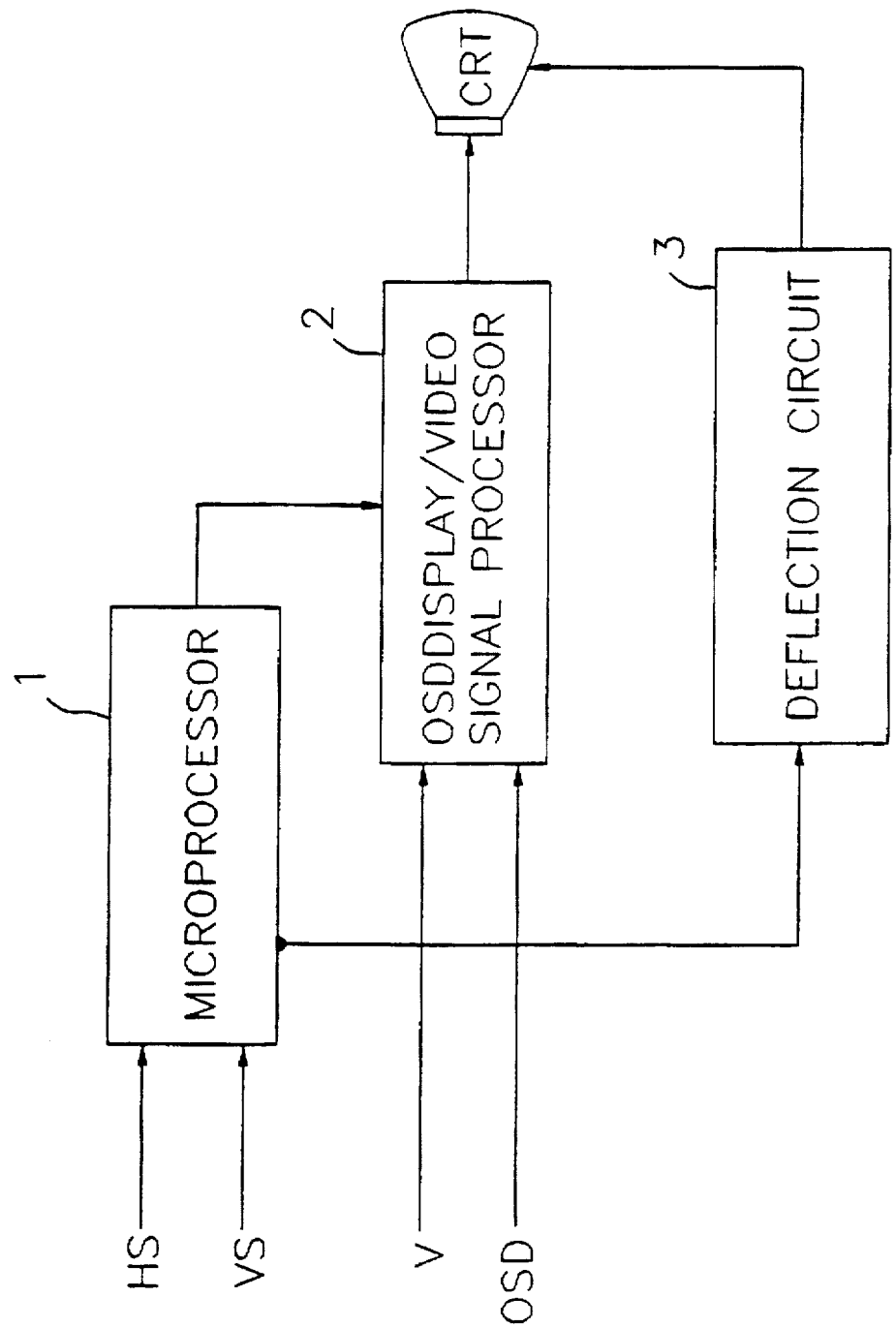
FIG. 1 is a block diagram for showing a construction of a conventional monitor.
Figure 2:
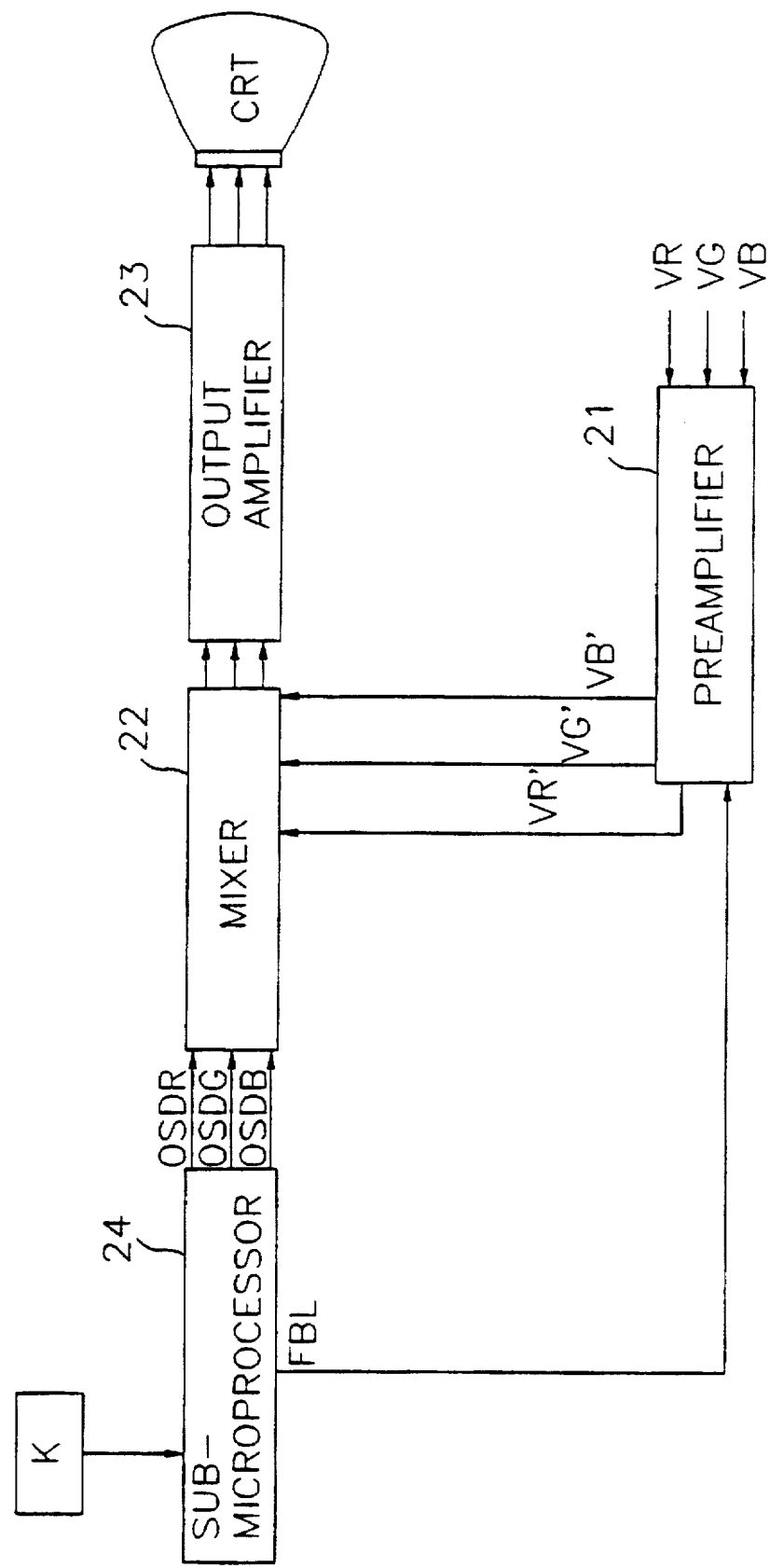
FIG. 2 is a detailed block diagram for showing a conventional OSD display/video signal processor of FIG. 1 in order to explain the operations of an OSD display.
Figure 3:
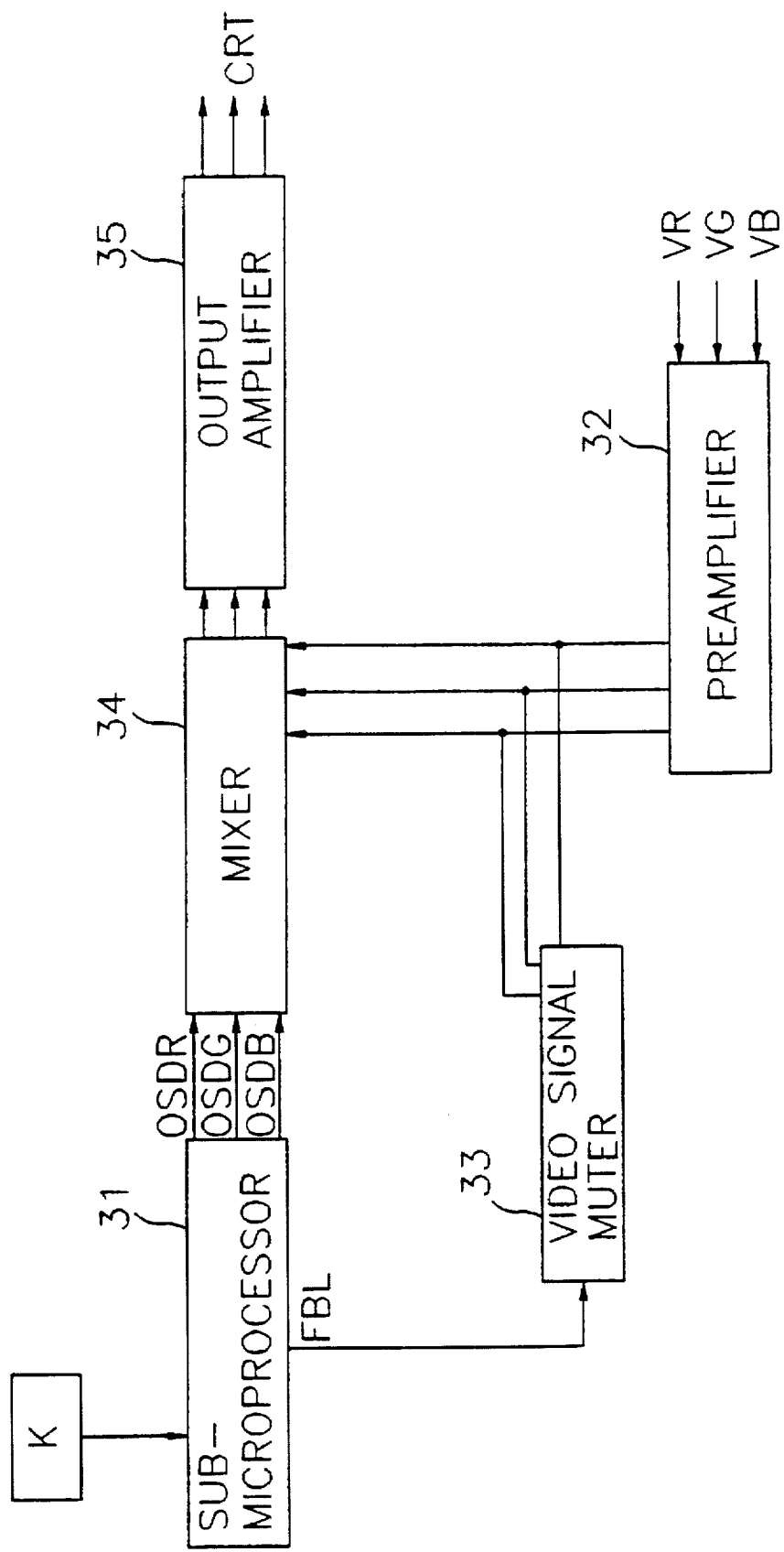
FIG. 3 is a block diagram for showing a construction of an OSD display/video signal processor according to first embodiment of the present invention.
Figure 4:
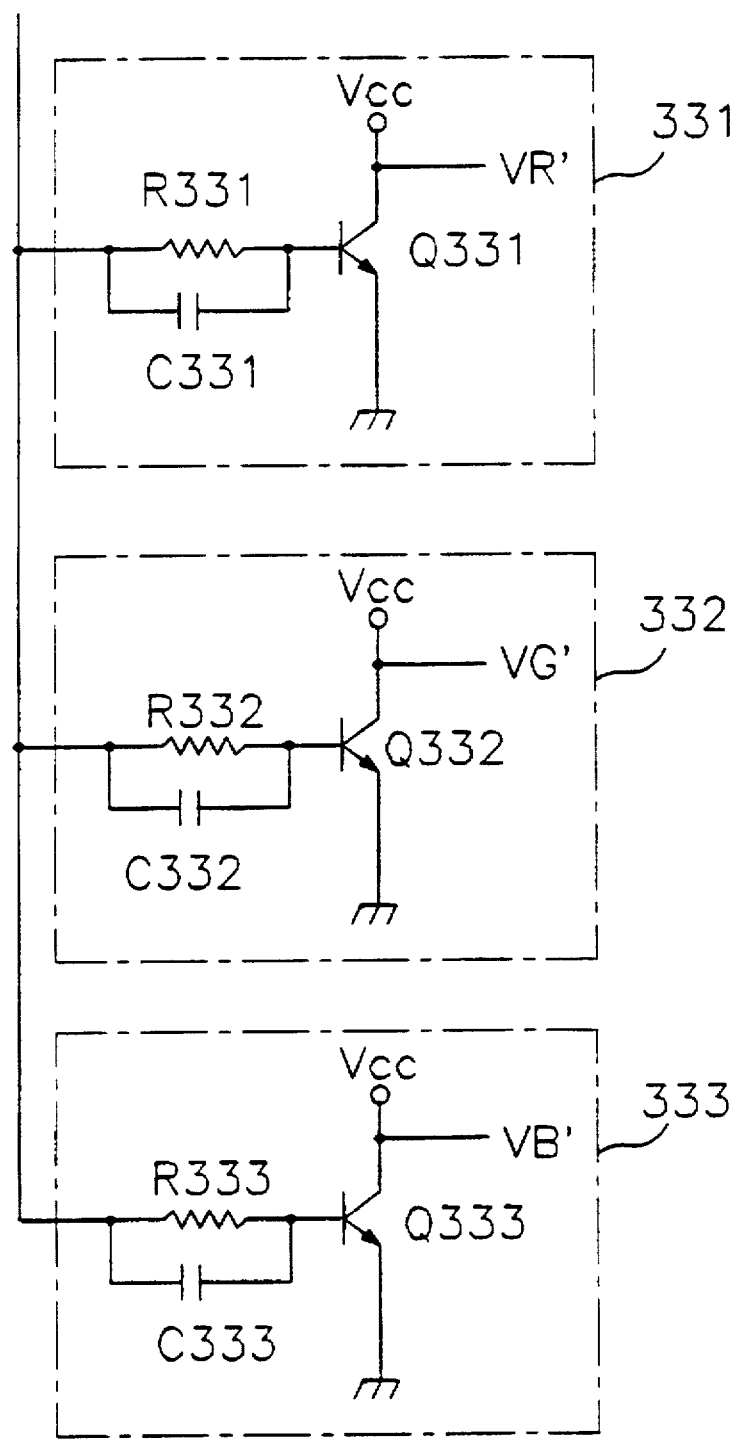
FIG. 4 a detailed circuit of a video signal muter of FIG. 3.

FIG. 3 is a block diagram for showing a construction of an OSD display/video signal processor according to first embodiment of the present invention, and FIG. 4 is detailed circuit of a video signal muter of FIG. 3. The is a OSD display/video signal processor as shown in FIG. 3 comprises a sub-microprocessor 31 for generating OSD display signals OSDR, OSDG and OSDB and a fast blanking signal with an input of a selection signal generated according to the selection of an OSD display mode selection Key K; a preamplifier 32 for amplifying a video signal; a video signal muter 33 for muting output signals VR', VG' and VB' of preamplifier 32 according to fast blanking signal FBL of sub-microprocessor 31; a mixer 34 for transforming output signals VR', VG' and VB' to signals of video signal levels; and an output amplifier 35 for amplifying the transformed signals of mixer 34 to be supplied to a cathode-ray tube.

Video signal muter 33 includes, as shown in FIG. 4, a first video signal muter 331 for removing an output signal VR' of preamplifier 32 according to fast blanking signal FBL outputted in a high level from sub-microprocessor 31; a second video signal muter 332 for removing an output signal VG' of preamplifier 32 according to fast blanking signal FBL outputted in a high level from sub-microprocessor 31; and a third video signal muter 333 for removing an output signal VB' of preamplifier 32 according to fast blanking signal FBL outputted in a high level from sub-microprocessor 31.

First video signal muter 331, as shown in FIG. 4, includes a resistor R331 for bypassing fast blanking signal FBL inputted in a high level. An output signal of resistor R331 drives a transistor Q331 in order to remove output signal VR' of preamplifier 32. A capacitor C331 is connected in parallel with resistor R331 So as to increase a driving speed of transistor Q331. The construction of each of second and third video signal muters 332 and 333 is the same as one of first video signal 331, respectively including resistors R332 and R333, transistors Q332 and Q333 and capacitors C332 and C333 as seen in FIG. 4.

The operations of OSD display/video signal processor according to first embodiment of the present invention will be described below in detail first, explanation will go to the case that an OSD display mode is not selected by a user. Video signals VR, VG an VB are applied to preamplifier 32 from the main processor of the computer (no shown) built in a monitor. Preamplifier 32 amplifies video signals VR, VG and VB. Since OSD display mode selection key K is not selected, a selection signal corresponding to OSD display mode selection key K is not applied to sub-microprocessor 31. Therefore, OSD display signals OSDR, OSDG and OSDB are not generated, whereas fast blanking signal FBL of a low level is generated. Fast blanking signal FBL of a low level is supplied to first, second and third video signal muters 331, 332 and 333 of video signal muter 33, as shown in FIG. 4. Fast blanking signal FBL of a low level turns transistor Q331 off through resistor R331 of first Video signal muter 331, so that output video signal VR' of preamplifier 32 is applied to mixer 34 without muting. In the same manner, fast blanking signal FML of a low level turns transistors Q332 and Q333 through resistors R332 and R333 of second and third video signal muters 332 and 333, respectively, so that output video signals VG' and VB' are supplied to mixer 34 without muting. Video signals VR', VG' and VB' are respectively converted to signals of video signal levels. The signals of video signal levels are inputted to output amplifier 35. An output signal of output amplifier 35 is applied to a cathode-ray tube of a monitor to perform an OSD display.

In the meantime, in case OSD display selection key K is selected, a selection signal corresponding to OSD display selection key K is generated. The selection signal corresponding to OSD display selection key K is applied to sub-microprocessor 31. Sub-microprocessor 31 generates OSD display signals OSDR, OSDG and OSDB for contrast, brightness, vertical and horizontal sizes while generating fast blanking signal of a high level. Fast blanking signal of a high level is applied to first, second and third video signal muters 331, 332 and 333 of video signal muter 33. In first video signal muter 331, fast blanking signal FBL of a high level turns transistor Q331 on through resistor R331, so that output signal VR' of preamplifier 32 is muted to the ground. A turning-on speed of transistor Q331 is controlled by a capacitor C331. In second video signal muter 332, fast blanking signal FBL of a high level mutes output signal VG' of preamplifier 32 rapidly through a turn-on of transistor Q332. In third video signal muter 333, fast blanking signal FBL of a high level mutes output signal VB' of preamplifier 32 rapidly through a turn-on of transistor Q333. At this time, OSD display signals OSDR, OSDG and OSDB of a TTL level outputted from sub-microprocessor 31 are respectively converted to signals of a video signal level through mixer 34. Output signals of mixer 34 are applied to output amplifier 35 for amplification. Output signals of output amplifier 35 are inputted to the cathode-ray tube for performing OSD display.

FIG. 5 is a block diagram for illustrating an OSD display/video signal processor according to second embodiment of the present invention. As shown in FIG. 5, constructions of sub-microprocessor 31, preamplifier 32, video signal muter 33, mixer 34, and output amplifier 35 are the same as ones shown in FIG. 3, respectively, except that video signal muter 33 is connected with input terminals of preamplifier 32.

The operations of OSD display/video signal processor according to second embodiment of the present invention will be explained below in detail.

In case OSD display selection key K is selected, a selection signal corresponding to OSD display selection key K is generated. The selection signal corresponding to OSD display selection key K is applied to sub-microprocessor 31. Sub-microprocessor 31 generates 0SD display signals OSDR, OSDG and OSDB for contrast, brightness, vertical and horizontal sizes while generating fast blanking signal of a high level. Fast blanking signal of a high level is applied to first video signal muter 331 of video signal muter 33 so as to remove video signal VR inputting to preamplifier 32. At the same time, fast blanking signal FBL Of a high level is supplied to second and third video signal muters 332 and 333 so as to remove video signal VG and VB inputting to preamplifier 32.

The operations of removing video signals VR, VG and VB inputting to preamplifier 32 are the same as ones described in the first embodiment of the present invention. Therefore, preamplifier 32 generates no output signals since it has no input signals. OSD display signals OSDR, OSDG and OSDB generated from sub-microprocessor 31 are inputted to mixer 34 which converts OSD display signals OSDR, OSDG and OSDB to signals of video signal levels. The signals of video signal levels are applied from mixer 34 to output amplifier 35. Output amplifier 35 amplifies the signals of video signal levels. Amplified signals of video signal levels are supplied to the cathode-ray tube.

In the meantime, the case that OSD display mode is not selected by a user will be described below.

In the case that a user does not select OSD display mode selection key K for contrast, brightness, vertical and horizontal sizes of the screen of a monitor, a selection signal corresponding to OSD display mode selection key K is not applied to sub-microprocessor 31. Therefore, sub-microprocessor 31 does not generate OSD display signals OSDR, OSDG and OSDB, whereas sub-microprocessor 31 generates fast blanking signal FBL of a low level. Fast blanking signal FBL of a low level is supplied to first, second and third video signal muter 331, 332 and 333 of video signal mutor 33, so that video signals VR, VG, and VB are inputted to preamplifier 32. Preamplifier 32 amplifies video signals VR, VG, and VB. Amplified video signals are supplied to mixer 34 which converts the amplified video signals to signals of video signal level. The signals of video signal level from mixer 34 are supplied to output amplifier 35 for amplification. The amplified signals of video signal level from output amplifier 35 are applied to the cathode-ray tube for OSD display.

As described above, OSD display/video signal processor according to the present invention enables a user to adjust an OSD display to the best quality. Further, a simplified construction of the video signal muter applied to the present invention reduces the production cost of a monitor.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. In an on-screen display/video signal processor having means for generating on-screen display signals and a fast blanking signal according to an on-screen display mode selection signal generated by an on-screen display mode selection key, means for amplifying video signals, means for converting the amplified video signals to signals of video signal levels and means for amplifying the signals of video signal levels to be supplied to a cathode-ray tube, the on-screen display/video signal processor comprising:

means for muting the video signals with an input of the fast blanking signal in order to remove the video signals rapidly according to a selection of the on-screen display mode selection key.

2. The on-screen display/video signal processor as claimed in claim 1, wherein the video signal muting means includes:

a first muting means for removing a first signal component of the video signals according to the fast blanking signal of a high level;

a second muting means for removing a second signal component of the video signals according to the fast blanking signal of a high level; and a third muting means for removing a third signal component of the video signals according to the fast blanking signal of a high level.

3. The on-screen display/video signal processor as claimed in claim 2, wherein the first, second and third signal components are an R signal component, G signal component and B signal component respectively.

4. The on-screen display/video signal processor as claimed in claim 2, wherein the first muting means includes:

a first resistor for bypassing the fast blanking signal;

a first transistor connected with the first resistor and for removing the first signal component of the video signals according to the bypassed fast blanking signal;

a first capacitor connected in parallel with the first resistor and for increasing the speed of a turn-on and a turn-off of the first transistor.

5. The on-screen display/video signal processor as claimed in claim 2, wherein the second muting means includes:

a second resistor for bypassing the fast blanking signal;

a second transistor connected with the second resistor and for removing the second signal component of the video signals according to the bypassed fast blanking signal;

a second capacitor connected in parallel with the second resistor and for increasing the speed of a turn-on and a turn-off of the second transistor.

6. The on-screen display/video signal processor as claimed in claim 2, wherein the third muting means includes:

a third resistor for bypassing the fast blanking signal;

a third transistor connected with the third resistor and for removing the third signal component of the video signals according to the bypassed fast blanking signal;

a third capacitor connected in parallel with the third resistor and for increasing the speed of a turn-on and a turn-off of the third transistor.

7. An on-screen display/video signal processor comprising:

means for generating an on-screen display mode selection signal;

means for generating on-screen display signals and a fast blanking signal with an input of the on-screen display mode selection signal;

an amplifier for amplifying video signals;

a muting means for muting the amplified video signals with an input of the fast blanking signal;

a converting means for converting the amplified video signals or the on-screen display signals to signals of a video signal level; and means for amplifying the signals of the video signal level and for supplying the amplified signals of the video signal level to a cathode-ray tube.

8. The on-screen display/video signal processor as claimed in claim 7, wherein the muting means includes:

a first muting means for removing a first signal component of the amplified video signals according to the fast blanking signal of a high level;

a second muting means for removing a second signal component of the amplified video signals according to the fast blanking signal of a high level; and a third muting means for removing a third signal component of the amplified video signals according to the fast blanking signal of a high level.

9. The on-screen display/video signal processor as claimed in claim 8, wherein the first, second and third signal components are an R signal component, G signal component and B signal component respectively.

10. The on-screen display/video signal processor as claimed in claim 8, wherein the first muting means includes:
   a first resistor for bypassing the fast blanking signal;
   a first transistor connected with the first resistor and for removing the first signal component of the amplified video signals according to the bypassed fast blanking signal;
   a first capacitor connected in parallel with the first resistor and for increasing the speed of a turn-on and a turn-off of the first transistor.

11. The on-screen display/video signal processor as claimed in claim 8, wherein the second muting means includes:
   a second resistor for bypassing the fast blanking signal;
   a second transistor connected with the second resistor and for removing the second signal component of the amplified video signals according to the bypassed fast blanking signal;
   a second capacitor connected in parallel with the second resistor and for increasing the speed of a turn-on and a turn-off of the second transistor.

12. The on-screen display/video signal processor as claimed in claim 8, wherein the third muting means includes:
   a third resistor for bypassing the fast blanking signal;
   a third transistor connected with the third resistor and for removing the third signal component of the amplified video signals according to the bypassed fast blanking signal;
   a third capacitor connected in parallel with the third resistor and for increasing the speed of a turn-on and a turn-off of the third transistor.

13. The an-screen display/video signal processor as claimed in claim 7, wherein the on-screen-display-signals-and-a-fast-blanking-signal generating means is a microprocessor.

14. The on-screen display/video signal processor as claimed in claim 7, wherein the amplifier is a preamplifier.

15. The on-screen display/video signal processor as claimed in claim 7, wherein the converting means is a mixer.

16. An on-screen display/video signal processor comprising:
   means for generating an on-screen display mode selection signal;
   means for generating on-screen display signals and a fast blanking signal with an input of the on-screen display mode selection signal;
   an amplifier for amplifying video signals;
   a muting means for muting the video signals with an input of the fast blanking signal;
   a converting means for converting the amplified video signals or the on-screen display signals to signals of a video signal level; and
   means for amplifying the signals of the video signal level and for supplying the amplified signals of the video signal level to a cathode-ray tube.

17. The on-screen display/video signal processor as claimed in claim 16, wherein the muting means includes:
   a first muting means for removing a first signal component of the video signals according to the fast blanking signal of a high level;
   a second muting means for removing a second signal component of the video signals according to the fast blanking signal of a high level; and
   a third muting means for removing a third signal component of the video signals according to the fast blanking signal of a high level.

18. The on-screen display/video signal processor as claimed in claim 17, wherein the first, second and third signal components are an R signal component, G signal component and B signal component respectively.

* * * * *